S. S. PATTON.
BISCUIT CUTTER.
APPLICATION FILED NOV. 20, 1918.

1,297,900.

Patented Mar. 18, 1919.

Witnesses
K. A. Thomas

Sarah S. Patton
Inventor

By Victor J. Evans
Attorney

UNITED STATES PATENT OFFICE.

SARAH S. PATTON, OF ACWORTH, GEORGIA.

BISCUIT-CUTTER.

1,297,900. Specification of Letters Patent. Patented Mar. 18, 1919.

Application filed November 20, 1918. Serial No. 263,367.

*To all whom it may concern:*

Be it known that I, Mrs. SARAH S. PATTON, a citizen of the United States, residing at Acworth, in the county of Cobb and State of Georgia, have invented new and useful Improvements in Biscuit-Cutters, of which the following is a specification.

This invention relates to articles for kitchen use, and has for its object the provision of a simple device which is adapted for use in cutting biscuits, doughnuts and which is also provided with means for sticking or forking biscuits as they are cut.

An important object is the provision of a biscuit cutter of this character which is provided interiorly with a reversible member adapted for use, when in one position, for converting the device into a dough cutter, and which is adapted, when in its other position, for sticking or forking the biscuits as they are cut.

An additional object is the provision of a device of this character which is extremely simple and inexpensive in manufacture, highly efficient in use and a general improvement in the art.

Figure 1:
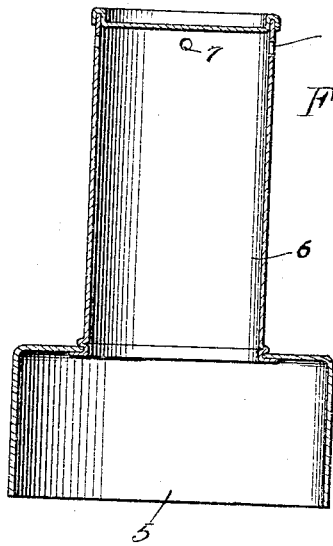
Figure 2:
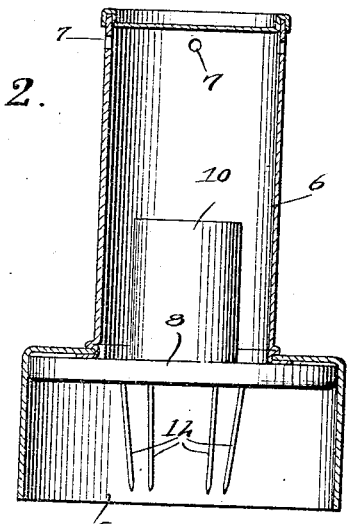
Figure 4:
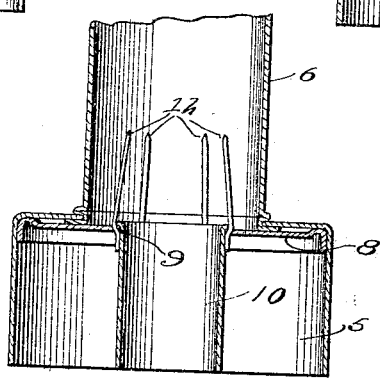
Figures 3, 5:
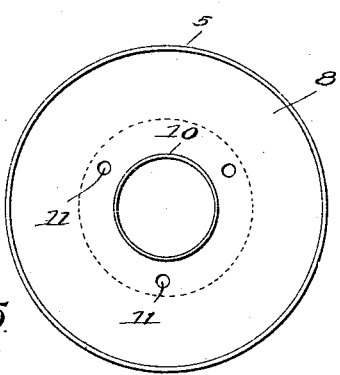

With the above and other objects in view, the invention consists in the details of construction to be hereinafter more fully described, claimed and illustrated in the accompanying drawing, in which:

Figure 1 is a longitudinal sectional view through the device, used simply as a biscuit cutter, Fig. 2 is a longitudinal sectional view with the removable and reversible member in position for sticking or forking the biscuits as they are cut, Fig. 3 is a bottom plan view with the parts arranged as in Fig. 2, Fig. 4 is a longitudinal sectional view through the device with the reversible member in position to form a doughnut cutter, and Fig. 5 is a bottom plan view with the parts arranged as in Fig. 4.

Referring more particularly to the drawing, the numeral 5 designates a cylindrical cup member upon the upper wall of which is secured or formed a reduced cylindrical extension 6 communicating with the interior of the cup member 5 and forming a handle. The reduced extension 6 is provided in its periphery with a plurality of holes 7 so as to avoid compression of air within the cup portion and reduced portion when the device is in use.

Disposable within the cup portion 5 is a reversible member comprising a disk 8 having a diameter equal to the inner diameter of the cup portion 5 so that the disk 8 will fit snugly within the cup. The disk 8 is provided with a central vertical opening 9 which is surrounded by a flange 10 having a height equal to the height of the cup 5. The disk 8 has further provided therein a plurality of holes 11 arranged in series around the flange 10. The purpose of the holes 11 is similar to the purpose of the holes 7 and is to avoid the compression of air within the device when in use.

Upon its side opposite the flange 10, the disk 8 is provided with a plurality of prongs 12 which are arranged in a circular series around the central opening 9. When the device is to be used simply as a biscuit cutter, the disk 8 is removed and the device is used as shown in Fig. 1 of the drawings by grasping the extension 6 forming the handle and cutting the dough with the edge of the cup portion 5. As the device is brought down upon the dough, the holes 7 will permit the air within the device to exhaust as the dough rises within the cup portion. When it is desired to use the device for cutting and simultaneously sticking the biscuits, the parts are arranged as shown in Figs. 2 and 3. In this use, the disk 8 is inserted within the cup portion 5 until it engages against the top thereof, the disk being inserted in such position that the flange 10 will extend upwardly within the reduced extension 6. The prongs 12 will then extend downwardly, terminating substantially in alinement with the edge of the cup 5. When the device is then brought down upon the dough to be cut, the dough will be cut into biscuit form by the cup portion 5 and the prongs 12 will stick into the dough and effectively stick or fork the same.

When the device is to be used as a doughnut cutter, the disk 8 is placed within the cup portion 5 in such position that the flange 10 will extend downwardly terminating substantially in alinement with the open edge of the cup 5. When the device is used with the parts in this position, the cup 5 will cut the outer periphery of the doughnuts, while the flange 10 will cut the central hole therefrom.

From the foregoing description and a study of the drawing it will be apparent that I have provided an extremely simple and efficient device which may be used for cutting biscuits, for cutting and simultaneously sticking biscuits, and which will be used for cutting doughnuts.

Having thus described the invention, what I claim is:

1. A device of the character described comprising a cylindrical cup member, a reduced cylindrical extension formed on the top of said cup member and communicating therewith serving as a handle, a disk disposed within said cup portion against the top wall thereof and provided with a central hole, a flange extending from one side of said disk in encircling relation to said hole, and a plurality of prongs extending from the other side of said disk in circular series in relation to said central hole, said extension and said prongs being of substantially the same length as the sides of said cup member, and said disks being reversible within said cup member whereby said flange or said prongs may be positioned operatively for coöperation with said cup member.

2. A device of the character described comprising a cylindrical cup member, a reduced cylindrical extension formed on the top thereof and communicating with the interior thereof, said extension being provided in its periphery with a plurality of holes, said extension serving as a handle, a disk disposable within said cup member and provided with a central hole and further provided with a series of holes arranged concentrically of said central hole, a flange extending from one side of said disk in encircling relation to said central hole therein, and a plurality of prongs extending from the other side of said disk in concentric relation to the central hole therein, said disk being reversible whereby the said flange or said prongs may be arranged in operative position.

In testimony whereof I affix my signature.

Mrs. SARAH S. PATTON.

Copies of this patent may be obtained for five cents each, by addressing the "Commissioner of Patents, Washington, D. C."